(12) United States Patent
Sosa et al.

(10) Patent No.: US 6,770,716 B1
(45) Date of Patent: Aug. 3, 2004

(54) USE OF ACCELERATORS IN FREE-RADICAL POLYMERIZATIONS OF STYRENE

(75) Inventors: Jose M. Sosa, Deer Park, TX (US); Cyril Chevillard, Dickinson, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 10/379,052

(22) Filed: Mar. 4, 2003

(51) Int. Cl.$^7$ .............. C08F 279/02; C08F 4/38

(52) U.S. Cl. .......... 525/316; 525/245; 525/263; 526/135; 526/228; 526/230; 526/230.5; 526/232; 526/232.3; 526/346

(58) Field of Search .............. 526/135, 228, 526/230, 230.5, 232, 232.3, 346; 525/245, 263, 316

(56) References Cited

U.S. PATENT DOCUMENTS

| | | | | |
|---|---|---|---|---|
| 2,632,758 A | * | 3/1953 | Brothman | 526/230 |
| 3,214,496 A | * | 10/1965 | Harris | 526/228 |
| 3,474,066 A | * | 10/1969 | Small et al. | 526/230 |
| 3,726,848 A | * | 4/1973 | Squire et al. | 526/346 |
| 4,777,210 A | | 10/1988 | Sosa et al. | |
| 5,115,055 A | | 5/1992 | Dais et al. | |
| 5,274,029 A | * | 12/1993 | Kelley | 525/53 |
| 5,719,243 A | | 2/1998 | Alferink et al. | |

OTHER PUBLICATIONS

B. R. Dean, "Graft Copolymers from Peroxidized EPDM Rubber," Journal of Applied Polymer Science, 1986, pp. 5619–5625, vol. 32, John Wiley & Sons, Inc.

A. Echte, "Rubber–Toughened Styrene Polymers," Rubber–Toughened Plastics, 1989, pp. 15–63, American Chemical Society.

"The Right Catalyst for the Right Job (for the Polyester Industry)," 2000, Atofina Chemicals, Inc., Philadelphia, PA.

W. Arayapranee, et al., "Synthesis of Graft Copolymers from Natural Rubber Using Cumene Hydroperoxide Redox Initiator," Journal of Applied Polymer Science, 2002, pp. 2993–3001, vol. 83, John Wiley & Sons, Inc.

* cited by examiner

Primary Examiner—Fred Teskin
(74) Attorney, Agent, or Firm—Madan, Mossman & Sriram, P.C.

(57) ABSTRACT

It has been discovered that certain compounds serve as polymerization accelerators when employed together with peroxide initiators for the polymerization of vinylaromatic monomers. Suitable accelerators that increase the rate of decomposition of the peroxide initiator include, but are not necessarily limited to, hydroperoxides and/or metallic salts. Representative examples of suitable hydroperoxide accelerators include t-butyl hydroperoxide (TBH), cumyl hydroperoxide, and p-isopropyl cumyl hydroperoxide, whereas suitable metallic salt accelerators include cobalt naphthenate and cobalt acetoacetonate. Use of these accelerators when vinylaromatic monomers are polymerized in the presence of polybutadienes and peroxide initiators results in an increase in grafting as compared with similar copolymers made without the accelerator.

27 Claims, 18 Drawing Sheets

USE OF ACCELERATORS IN FREE-RADICAL POLYMERIZATIONS OF STYRENE

FIELD OF THE INVENTION

The present invention is related to methods and compositions useful to improve the manufacture of polystyrene and copolymers of styrene. It relates more particularly to methods of polymerizing and copolymerizing styrene monomer with peroxide and hydroperoxide initiators in the presence of compounds that accelerate the decomposition of peroxide initiators.

BACKGROUND OF THE INVENTION

High impact polystyrene (HIPS) is an example of graft polymer formation between polystyrene and polybutadiene. A wide variety of peroxy compounds is known from the literature as initiators for the production of styrenic polymers. Commercially available initiators for polymer production may be classified in different chemical groups, which include diacylperoxides, peroxydicarbonates, dialkylperoxides, peroxyesters, peroxyketals, and hydroperoxides. Peroxides and hydroperoxides undergo at least four reactions in the presence of monomers or hydrocarbons with double bonds. These reactions are: 1) chain transfer, 2) addition to monomer, 3) hydrogen abstraction, and 4) recombination, often called a cage effect.

Hydroperoxides have been shown to undergo induced decomposition reactions, in which a polymer radical (~~P*) will react with the initiator as shown below. This reaction is basically a chain transfer reaction and the reaction should be amenable to the well-known chain transfer equations. Radicals obtained from peroxide initiators (RCOO*) can also abstract a hydrogen from the hydroperoxide.

Baysal and Tobolsky (*Journal of Polymer Science*, Vol. 8, p. 529 et seq., (1952), incorporated by reference herein) investigated the chain transfer of polystyryl radicals to t-butyl hydroperoxide (t-BHP), cumyl hydroperoxide (CHP), benzoyl peroxide ($Bz_2O_2$), and azobisisobutyronitrile (AIBN). AIBN and benzoyl peroxide give the classical linear correlations between rate and 1/DP (Degree of Polymerization) indicating no chain transfer to initiators. The hydroperoxides, however, show significant levels of chain transfer.

A. I. Lowell and J. R. Price (*Journal of Polymer Science*, Vol. 43, p.1, et seq. (1960), incorporated by reference herein) also showed that polystyryl radicals undergo considerable chain transfer with bis(2,4-dichloro) benzoyl peroxide as compared to dilauroyl peroxide.

The transition metal catalyzed peroxidation of the pendant allylic functionality in ethylene-propylene-diene monomer (EPDM) rubbers with tertiary butyl hydroperoxide results in elastomeric, high polymer peroxides, according to B. Dean in "Graft Copolymers from Peroxidized EPDM Rubber," *Journal of Applied Polymer Science*, Vol. 32, pp. 5619–5625 (1986), incorporated by reference herein. The peroxidized EPDM rubbers are useful as free radical initiators for the polymerization and grafting of vinyl monomers in the preparation of comb-type structures. The grafted EPDM rubbers are efficient impact modifiers for thermo-plastic resins so long as the polymer grafted onto the EPDM is identical to or is thermodynamically miscible with the composition of the thermoplastic resin.

Cobalt naphthenate and hydroperoxides of methyl ethyl ketone or other hydroperoxides are known to initiate styrene polymerizations at room temperature, and in fact, this reaction is used to form castings.

It would be desirable if methods could be devised or discovered to accelerate the polymerization rate of HIPS, and/or increase the grafting that occurs during this polymerization.

SUMMARY OF THE INVENTION

There is provided, in one form, a method for polymerizing that involves polymerizing at least one vinylaromatic monomer in the presence of a peroxide initiator. An accelerator is added into the vinylaromatic monomer, where the accelerator is a hydroperoxide and/or a metallic salt. The amount of accelerator is effective to accelerate the rate of polymerization as compared with an otherwise identical method without the accelerator. A polymerized product is recovered.

In another embodiment of the invention, there are provided monomer compositions made by the process described above that include an accelerator, and polymerized products made by the method described above.

In another embodiment of the invention, there is provided a vinylaromatic/diene graft copolymer that involves reacting at least one vinylaromatic monomer with at least one polydiene, in the presence of a peroxide initiator. An accelerator is added to the vinylaromatic monomer, where the accelerator is a hydroperoxide and/or a metallic salt. The amount of accelerator is effective to increase the grafting of the resulting copolymer as compared with an otherwise identical method absent the accelerator. Again, a polymerized product is recovered.

DETAILED DESCRIPTION OF THE INVENTION

Figure 1:
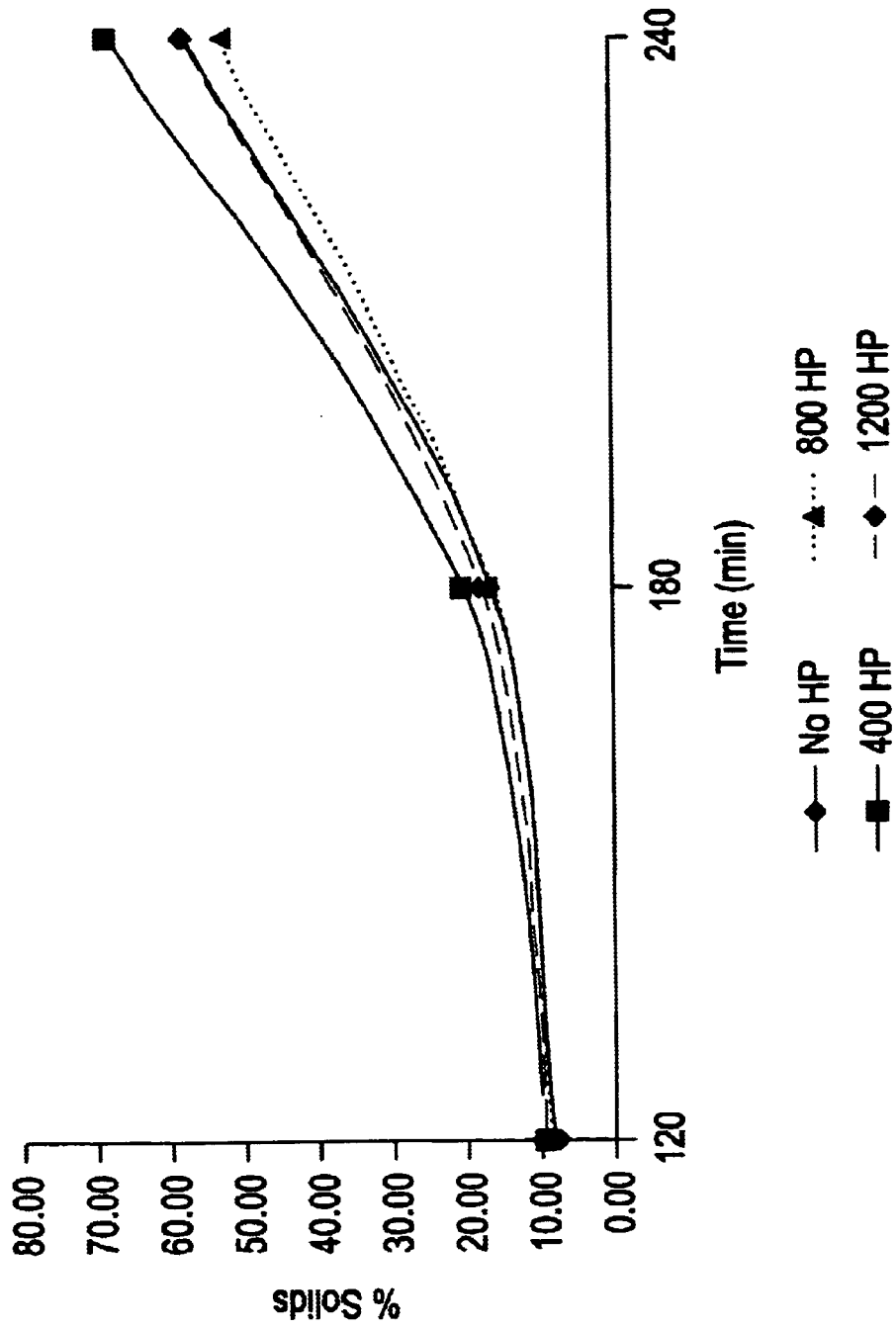
FIG. 1 is a graph of the % solids as a function of time in the polymerization of HIPS in the presence of t-butyl hydroperoxide (TBH) only.

The composition of the invention can comprise a polydiene-modified monovinyl aromatic polymer, and can comprise a rubber (polybutadiene)-modified polystyrene. Styrene monomer can be polymerized in the presence of from about 2 to about 15 weight percent rubber to produce a polymer having impact resistance superior to that of polystyrene homopolymer. A rubber that can be used in making the subject compositions is polybutadiene. The resultant thermoplastic composition, which can be made with these materials, is high impact polystyrene, or HIPS. The predominant morphology of the polymer made from embodiments of the invention is cell or "salami" with some core-shell, meaning that the continuous phase of polystyrene comprises a plurality of dispersed structures in which polystyrene is trapped within rubber particles having a distinct membrane and small quantities of polystyrene are occluded inside single cell polybutadiene shells grafted to the aromatic polymer.

Styrene polymerization processes are well known. The compositions of the invention can be made by batch polymerization in the presence of from about 2 to 15, and in some embodiments can be from about 4 to about 12, weight percent polybutadiene using conventional initiators at concentrations of from about 100 to about 800 ppm and using a solvent. Hydroperoxide and peroxydicarbonate, peroxyesters, peroxyketals, dialkyl peroxides initiators useful in making the invention include peroxide initiators having a half-life of one hour at 110–130° C., including, but not necessarily limited to, 1,1-di-(t-butylperoxy) cyclohexane (LUPERSOL® 331 catalyst or L-331 available from ATOFINA Chemicals, Inc.); 1,1-di-(t-amylperoxy) cyclohexane (LUPERSOL® 531 catalyst or L-531 available from ATOFINA Chemicals, Inc.); t-amyl peroxy-2-ethylhexyl carbonate (TAEC), t-butylperoxy isopropyl carbonate (TBIC), ethyl-3,3-di(t-butylperoxy)butyrate; t-butyl perbenzoate; 1,1di-(t-butylperoxy)-3,3,5-trimethylcyclohexane (LUPERSOL® 231 catalyst or L-231 available from ATOFINA Chemicals, Inc.); and ethyl-3,3-di(t-amylperoxy)butyrate (LUPERSOL 533).

Suitable solvents include, but are not necessarily limited to ethylbenzene, xylenes, toluene, hexane and cyclohexane.

In the context of the invention, the hydroperoxide initiators of this invention are different from the hydroperoxide accelerators.

Grafting is also favored by using polybutadiene having a medium or high-cis isomer content. Polybutadiene useful in making the composition of the invention is produced, for example, by known processes by polymerizing butadiene in either a hexane or cyclohexane solvent to a concentration of about 12 weight percent, and flashing off the solvent at a temperature ranging from about 80° to 100° C. to further concentrate the polybutadiene solution to about 24 to 26 weight percent, the approximate consistency of rubber cement. The crumb polybutadiene is then precipitated from the solution using steam, then dried and baled. Commercially available rubbers suitable for producing HIPS are available from several suppliers such as Bayer 380, 550, and 710 (Bayer Corporation, Orange, Tex.) and Firestone Diene 35, 55 and 70 (Firestone Polymers, Akron, Ohio).

In making the certain compositions of the invention, batch polymerizations can be conducted in 97:3 to 91:9 styrene to rubber, 85:15 to 80:20 typical styrene solvent mixtures to 60–80% styrene conversion to polystyrene and then flashing off the unreacted monomer and the solvent. In a non-limiting, typical preparation, 3–12% of rubber is dissolved in styrene, then about 10% ethylbenzene is added as 90:10 styrene:ethylbenzene. The ethylbenzene diluent could include solvent, but have other components present as well. A possible temperature profile to be followed in producing the subject compositions is about 110° C. for about 75 minutes, about 130° C. for about 60 minutes, and about 150° C. for about 60 minutes. The polymer is then dried and devolatilized by conventional means. Although batch polymerizations are used to describe the invention, the reactions described can be carried out in continuous units, as the one described by Sosa and Nichols in U.S. Pat. No. 4,777,210, incorporated by reference herein.

It has been surprisingly discovered that accelerators can be used together with conventional peroxide initiators to accelerate the decomposition of the peroxides commonly used in the manufacture of polystyrene and HIPS. The accelerator may be added prior to, during or after the initiator is added to the monomer. The result of this accelerated peroxide decomposition is an increase in polymerization rate and/or an increase in grafting in HIPS copolymer.

The effect is surprising because the use of t-butyl hydroperoxide (TBH) in the synthesis of HIPS at temperatures between 110 and 130° C. normally shows a very small catalytic effect, since the 1-hour half-life of this peroxide is 185° C. As will be shown, the polymerization reaction in the presence of TBH only proceeds thermally.

Suitable hydroperoxide accelerators of this invention include, but are not necessarily limited to t-butyl hydroperoxide (TBH), cumyl hydroperoxide, p-isopropyl cumyl hydroperoxide, methyl ethyl ketone hydroperoxide, 1,1,3,3-tetramethyl butyl hydroperoxide, and cyclohexane hydroperoxide and mixtures thereof. The metallic salt accelerators of this invention include, but are not necessarily limited to cobalt naphthenate, cobalt octoate (2-ethyl hexanoate), cobalt acetoacetonate, copper naphthenate, iron naphthenate, and iron octoate (2-ethyl hexanoate), and mixtures thereof. The hydroperoxide accelerator may be added in an amount ranging from about 100 to about 1200 ppm, based on the vinylaromatic monomer, and can be in an amount ranging from about 200 to about 600 ppm. The metallic salt accelerator may be added in an amount ranging from about 10 to about 1200 ppm, with amounts ranging from about 50 to about 400 ppm or up to 600 ppm possible.

Initial reactions were carried out using a standard formulation of 200 grams of 8% Bayer 550 at 110 to 150° C. using t-butyl hydroperoxide with TAEC and L-531. More specifically, a standard HIPS temperature profile was used (2 hrs at 110° C., 1 hr at 130° C. and 1 hr at 150° C.).

FIG. 1 shows the effect of TBH on the polymerization of HIPS without peroxides. The curves show that even at high levels of TBH, the % solids at the end of the third ramp were low, suggesting that the reaction is primarily thermal.

Figure 2:
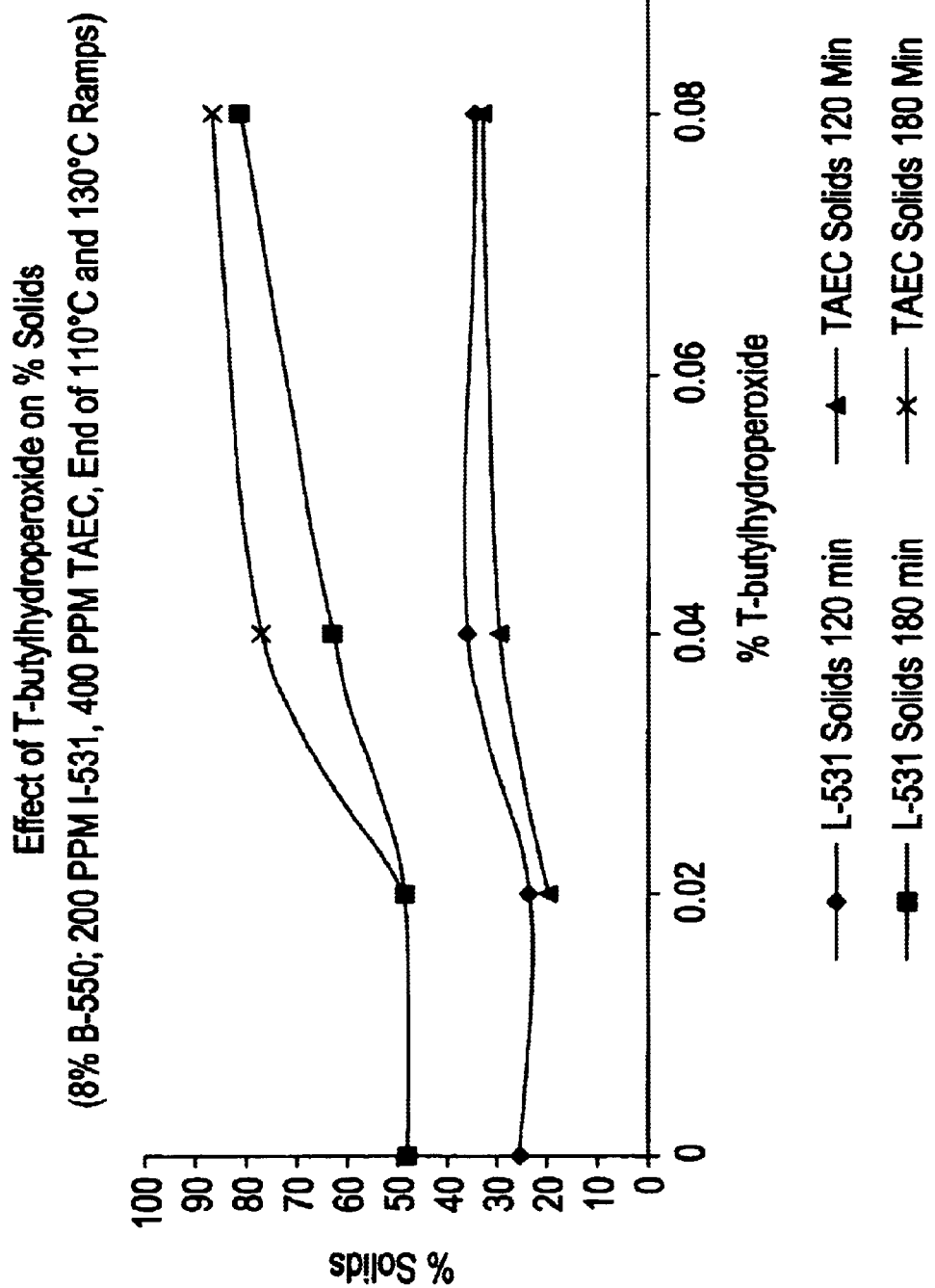
FIG. 2 is a graph of the effect of TBH on the % solids in polymerization of HIPS with two different peroxide initiators, 200 ppm L-531 and 400 ppm TAEC with 8% Bayer-550.

As mentioned before, the one-hour half-life (1 Hr $t_{1/2}$) of TBH is 185° C., while the 1 Hr $t_{1/2}$ of TAEC and L-531 is about 115–117° C. While no effect was expected with TBH at temperatures used to produce low MFI HIPS, TBH showed some unexpected properties. Table I summarizes the solution properties of the rubber phase using TBH. The following observations can be made using TBH:

FIG. 2 shows slightly higher reaction rates as the level of TBH is increased even at the relatively low temperature of 110° C.

Table IV shows that the % rubber levels varied due to the final conversion achieved.

Rubber particle size is shown to increase slightly as the level of TBH increased.

Figure 3:
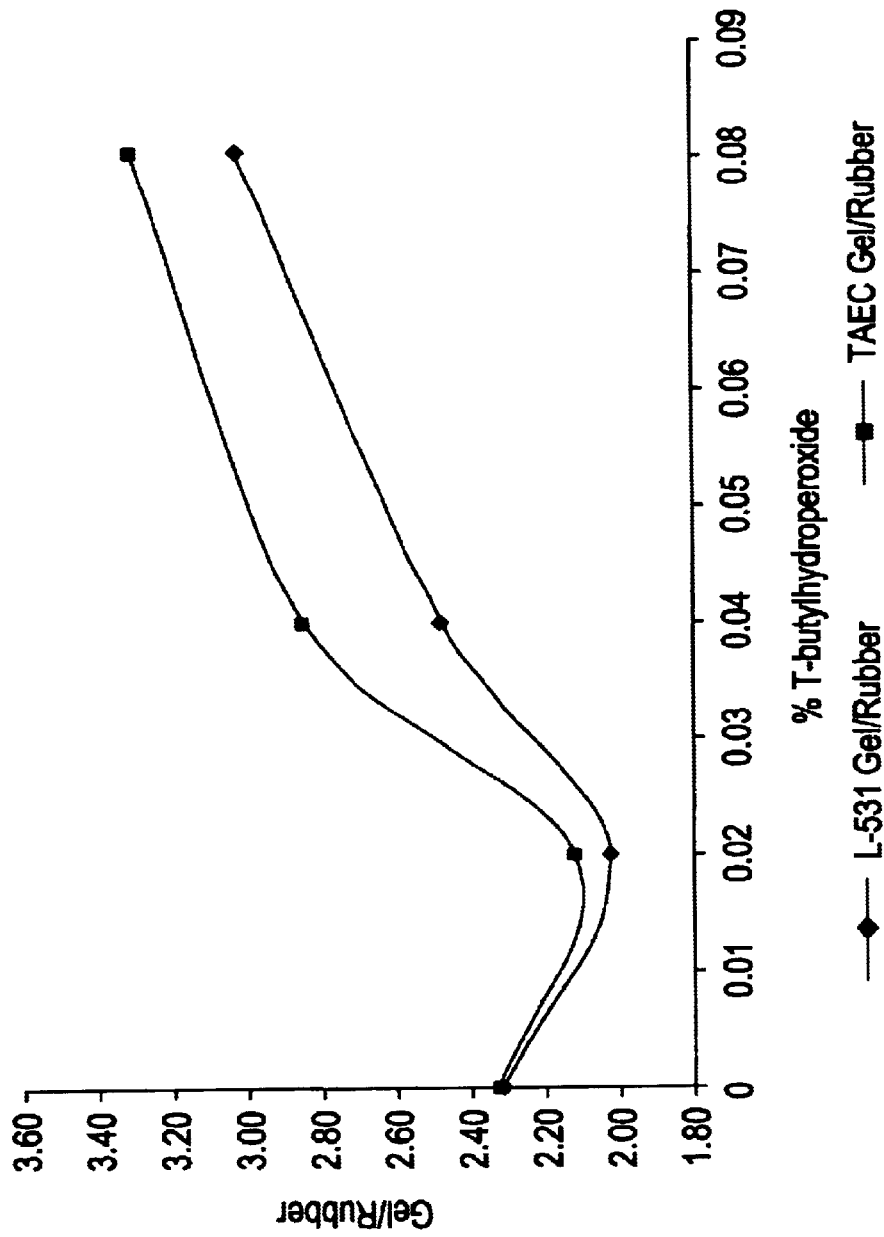
FIG. 3 is a graph of the effect of TBH on the gel/rubber ratio of 8% HIPS formulations.

FIG. 3 shows higher gel/rubber ratios at the highest TBH level used. At this time, there is not an explanation for the dip shown at about 0.02% TBH.

TAEC shows higher grafting than L-531. Active oxygen levels for TAEC and L-531 are 6.1 vs. 11.1, so that the initiators are compared at different ppm levels.

TABLE I

Summary of Solution Properties of Rubber Phase with t-butyl hydroperoxide

| Ex. | Sample Name | % TBH | RPS | Swell Index | % Gel | % Graft | % Rubber | Gel/Rubber |
|---|---|---|---|---|---|---|---|---|
| 1 | 200 PPM L-531 | 0 | 1.5 | 10.9 | 31.5 | 132 | 13.6 | 2.32 |

TABLE I-continued

Summary of Solution Properties of Rubber Phase with t-butyl hydroperoxide

| Ex. | Sample Name | % TBH | RPS | Swell Index | % Gel | % Graft | % Rubber | Gel/Rubber |
|---|---|---|---|---|---|---|---|---|
| 2 | 200 PPM L-531 | 0.02 | 1.7 | 9.7 | 31.0 | 103 | 15.3 | 2.03 |
| 3 | 200 PPM L-531 | 0.04 | 2.6 | 11.2 | 40.7 | 148 | 16.5 | 2.47 |
| 4 | 200 PPM L-531 | 0.08 | 2.7 | 9.8 | 39.4 | 203 | 13.0 | 3.03 |
| 5 | 400 PPM TAEC | 0.02 | 1.4 | 9.8 | 40.9 | 112 | 19.3 | 2.12 |
| 6 | 400 PPM TAEC | 0.04 | 2.9 | 11.1 | 37.9 | 185 | 13.3 | 2.85 |
| 7 | 400 PPM TAEC | 0.08 | 2.4 | 9.8 | 39.7 | 206 | 12.0 | 3.31 |

NOTES:
1. % TBH is given as % of Styrene.
2. RPS is volume median rubber particle size measured by a Malvern Analyzer in methyl ethyl ketone.
3. Swell index is defined as 100 × wt. of wet gel/wt of dry gel.
4. % Gel is determined by centrifugation of samples dissolved in toluene. It is defined as 100 × dry gel/wt. of sample.
5. % Grafting is defined as 100 (% gels - % rubber/% rubber).
6. % Rubber is measured by the iodine monochloride method.
7. % Gel/% rubber is a measure of rubber utilization.

As noted, FIG. 2 shows the effect of TBH on % solids during the polymerization of an 8% rubber solution using a temperature profile of 120 minutes at 110° C. and 60 minutes at 130° C., in the presence of two initiators that are good grafting initiators. FIG. 2 shows the % solids obtained at the end of the first and second temperature ramps. The effect of TBH is higher than expected. In fact at the temperatures used, the effect of TBH should be negligible. TAEC seems to be affected more than L-531. It thus appears that TBH is acting as a promoter or accelerator under the conditions used. The rapid increase in the range of 55–65% solids is important, since in some process the reaction rate may drop off toward the end of a continuous process.

In addition to a rate increase, TBH at the 0.08 level gives a high level of grafting. As shown in the Table II, below, Example 4 gave 203.2% grafting.

TABLE II

Rubber Phase Properties of HIPS: Polymerization of 8% Bayer 550 with L-531 and t-Butyl Hydroperoxide (TBH)

| Ex. | Sample name | % TBH | % Solids @ 180 mins | RPS | Swell index | % Gel | % Grafting | % Rubber | Gel/rubber |
|---|---|---|---|---|---|---|---|---|---|
| 1 | 200 ppm L-531 Control | 0 | 59 | 1.5 | 10.94 | 31.46 | 131.8 | 13.57 | 2.32 |
| 2 | 200 ppm L-531 0.02% TBH | 0.02 | 52 | 1.7 | 9.69 | 30.98 | 102.6 | 15.29 | 2.03 |
| 3 | 200 ppm L-531 0.04% TBH | 0.04 | 48 | 2.6 | 11.24 | 40.73 | 147.5 | 16.46 | 2.47 |
| 4 | 200 ppm L-531 0.08% TBH | 0.08 | 62 | 2.7 | 9.77 | 39.41 | 203.2 | 13 | 3.03 |

In order to determine if the observations with t-butyl hydroperoxide apply to other hydroperoxides, HIPS syntheses were conducted using p-isopropyl cumyl hydroperoxide (di-isopropyl benzene monohydroperoxide). This peroxide is sold with an assay around 60%, since it is a mixture of the hydroperoxide with di-iso-propylbenzenes. HIPS batches were carried out using the temperature profile mentioned in previously, but using 4% Bayer 550 solutions.

Figure 4:
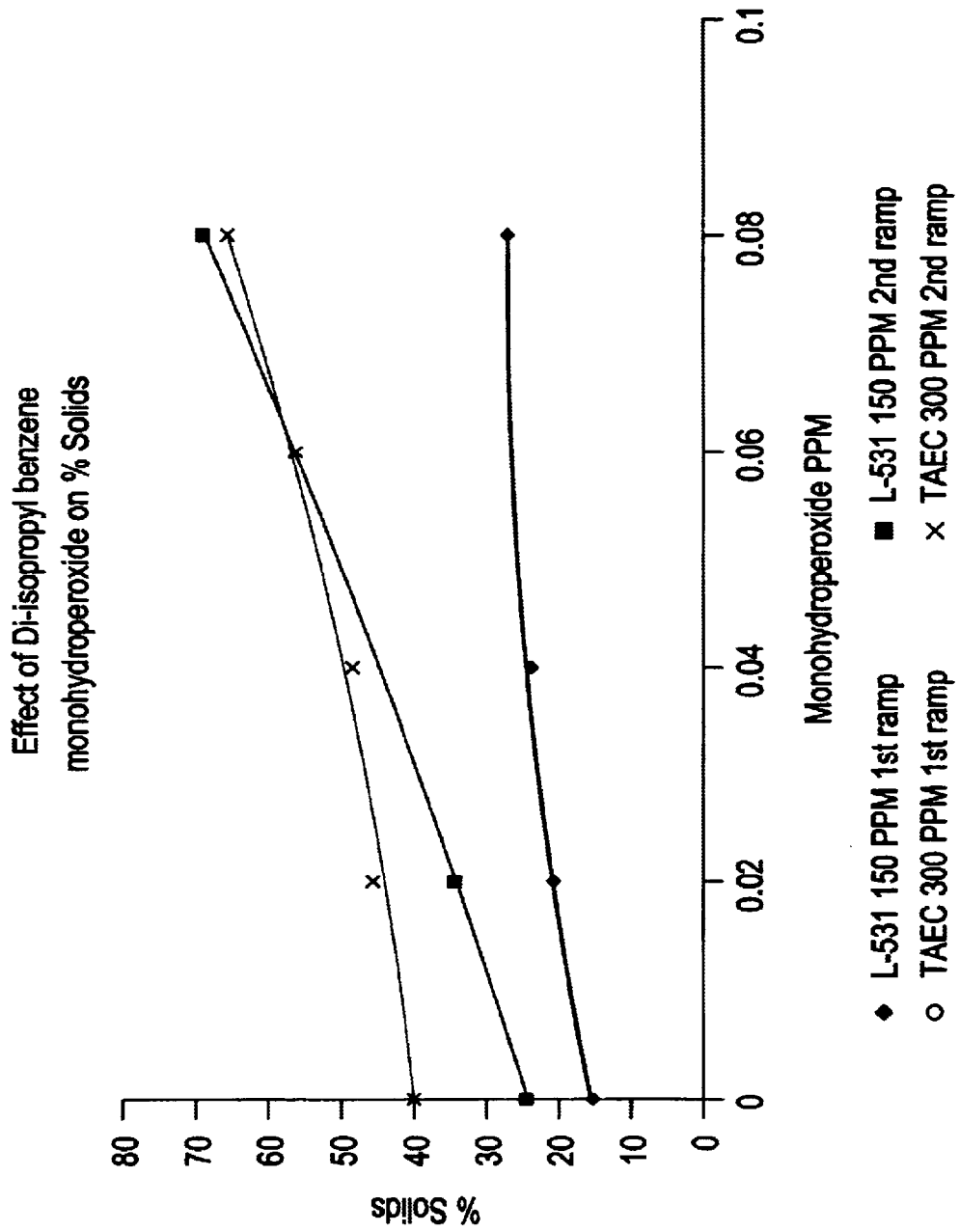
FIG. 4 is a plot of % solids as a function of ppm p-isopropyl benzene hydroperoxide, where the first ramp was 2 hours at 110° C. and the second ramp was 1 hour at 139° C.

Table III summarizes the properties of the gel phase and FIG. 4 shows a of % solids at a given time vs. the level of hydroperoxide. The effect of di-isopropyl benzene monohydroperoxide (DIBMH), when combined with L-531 and TAEC, on the gel/rubber ratio is higher than that observed with t-butyl hydroperoxide.

TABLE III

Summary of Data with DIBMH

| Ex. | Formulation | RPS | % Gels | Swell Index | Final** conversion | % Rubber | gel/ rubber |
|---|---|---|---|---|---|---|---|
| 8 | 300 ppm TAEC | 1.8 | 15.9 | 12.9 | 63.6 | 6.3 | 2.5 |
| 9 | 0.02% EHP w/TAEC | 1.9 | 16.9 | 11.2 | 71.5 | 5.6 | 3.0 |
| 10 | 0.04% EHP w/TAEC | 1.9 | 17.2 | 11.6 | 74.1 | 5.4 | 3.2 |
| 11 | 0.08% EHP w/TAEC | 1.7 | 15.0 | 13.8 | 82.2 | 4.9 | 3.1 |
| 12 | 150 ppm L-531 | 1.2 | 15.7 | 11.2 | 40.6 | 9.9 | 1.6 |
| 13 | 0.02% EHP w/L-531 | 1.0 | 14.5 | 10.7 | 61.2 | 6.5 | 2.2 |
| 14 | 0.04% EHP w/L-531 | 2.1 | 19.4 | 9.2 | 71.2 | 5.6 | 3.5 |
| 15 | 0.08% EHP w/L-531 | 2.1 | 21.1 | 9.0 | 69.0 | 5.8 | 3.6 |

**Final Conversion determined by measuring weight loss during (after) devolatilization HIPS syntheses were also carried out using cumyl hydroperoxide in combination with TAEC and L-531.

Table IV summarizes the effect of increasing the level of cumyl hydroperoxide on gel/rubber ratio. The data with cumyl hydroperoxide shows more scatter in RPS and swell index values, and the exact reason for this is unknown. The trend that is observed is similar in that increasing the level of hydroperoxide increases the gel/rubber ratio significantly, even though the swell indices are quite high.

Figure 5:
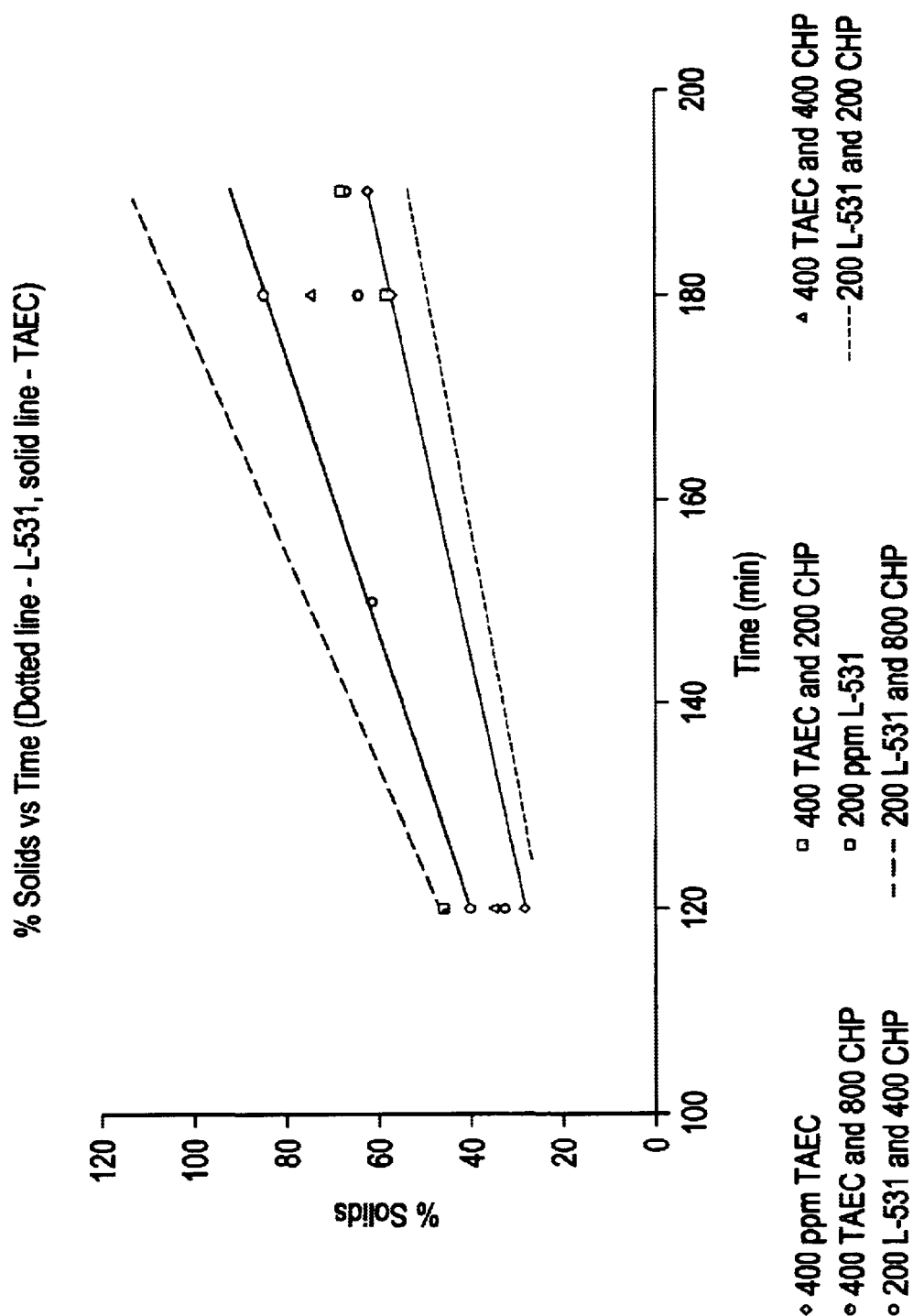
FIG. 5 is a graph of the effect of cumyl hydroperoxide levels on polymerization on HIPS polymerization where the dotted line represents L-531 initiator and the solid line represents TAEC initiator.

FIG. 5 shows that cumyl hydroperoxide in mixtures with TAEC and L-531 increase rate at relatively low temperatures (110 and 130° C.). It is also clear that the effect of the hydroperoxide depends on the initiator used.

Table V shows the effect of different conversions at constant initiator level on gel/rubber ratio. The data shows that gel/rubber increases as the conversion increases.

The molecular weight data shows that there is a slight decrease in $M_n$ as the reaction is allowed to proceed to higher conversions.

TABLE IV

Summary of Rubber Phase Properties of HIPS Prepared with Cumyl Peroxide

| Ex. | Sample Name | RPS | % Gels | Swell Index | Final conversion | % rubber | Gel/ Rubber |
|---|---|---|---|---|---|---|---|
| 16 | 400 ppm TAEC | 2.6 | 14.7 | 18.5 | 62.9 | 6.4 | 2.32 |
| 17 | 400 ppm TAEC and 200 ppm cumyl hydroperoxide | 4.1 | 11.4 | 15.7 | 68.0 | 5.9 | 1.94 |
| 18 | 400 ppm TAEC and 400 ppm cumyl hydroperoxide | 2.2 | 12.9 | 18.5 | 75.2 | 5.3 | 2.43 |
| 19 | 400 ppm TAEC and 800 ppm cumyl hydroperoxide | 2.6 | 13.4 | 16.7 | 84.9 | 4.7 | 2.85 |
| 20 | 200 ppm L-531 | 1.8 | 17.6 | 11.3 | 53.0 | 7.6 | 2.33 |
| 21 | 200 ppm L-531 and 200 cumyl hydroperoxide | 2.7 | 15.8 | 13.5 | 66.7 | 6.0 | 2.64 |
| 22 | 200 ppm L-531 and 400 cumyl hydroperoxide | 1.6 | 15.4 | 16.4 | 61.9 | 6.5 | 2.39 |
| 23 | 200 ppm L-531 and 800 cumyl hydroperoxide | 3.6 | 15.3 | 12.3 | 75.91 | 5.3 | 2.90 |

TABLE V

Summary of HIPS Polymerization: Constant initiator; Different Conversions

| | Ex. | | | |
|---|---|---|---|---|
| | 24<br>200 ppm L-531 and 400 ppm Cumyl Peroxide | 25<br>200 ppm L-531 and 400 ppm Cumyl hydroperoxide | 26<br>200 ppm L-531 and 400 ppm Cumyl hydroperoxide | 27<br>200 ppm L-531 and 400 ppm Cumyl hydroperoxide |
| % Solids | 46 | 52.4 | 58.4 | 67.7 |
| RPS | 2.09 | 2.55 | 2.21 | 2.77 |
| Mn | 112812 | 111190 | 116126 | 97460 |
| Mw | 254875 | 246138 | 251377 | 242774 |
| Mz | 398778 | 382217 | 395705 | 393254 |
| Peak MW | 260076 | 250362 | 251906 | 249770 |
| Polydispersity | 2.26 | 2.21 | 2.16 | 2.49 |
| Swell Index | 8.5 | 9.0 | 14.3 | 8.1 |
| % Rubber | 8.70 | 7.63 | 6.85 | 5.91 |
| % Gel | 24.2 | 23.8 | 18.1 | 21.1 |
| Gel/Rubber | 2.78 | 3.12 | 2.64 | 3.57 |
| % Grafting | 178 | 212 | 164 | 257 |

The effect of cumyl hydroperoxide (CHP) on molecular weights was determined in attempt to study the chain transfer activity of the hydroperoxide in styrene syntheses.

Figure 6:
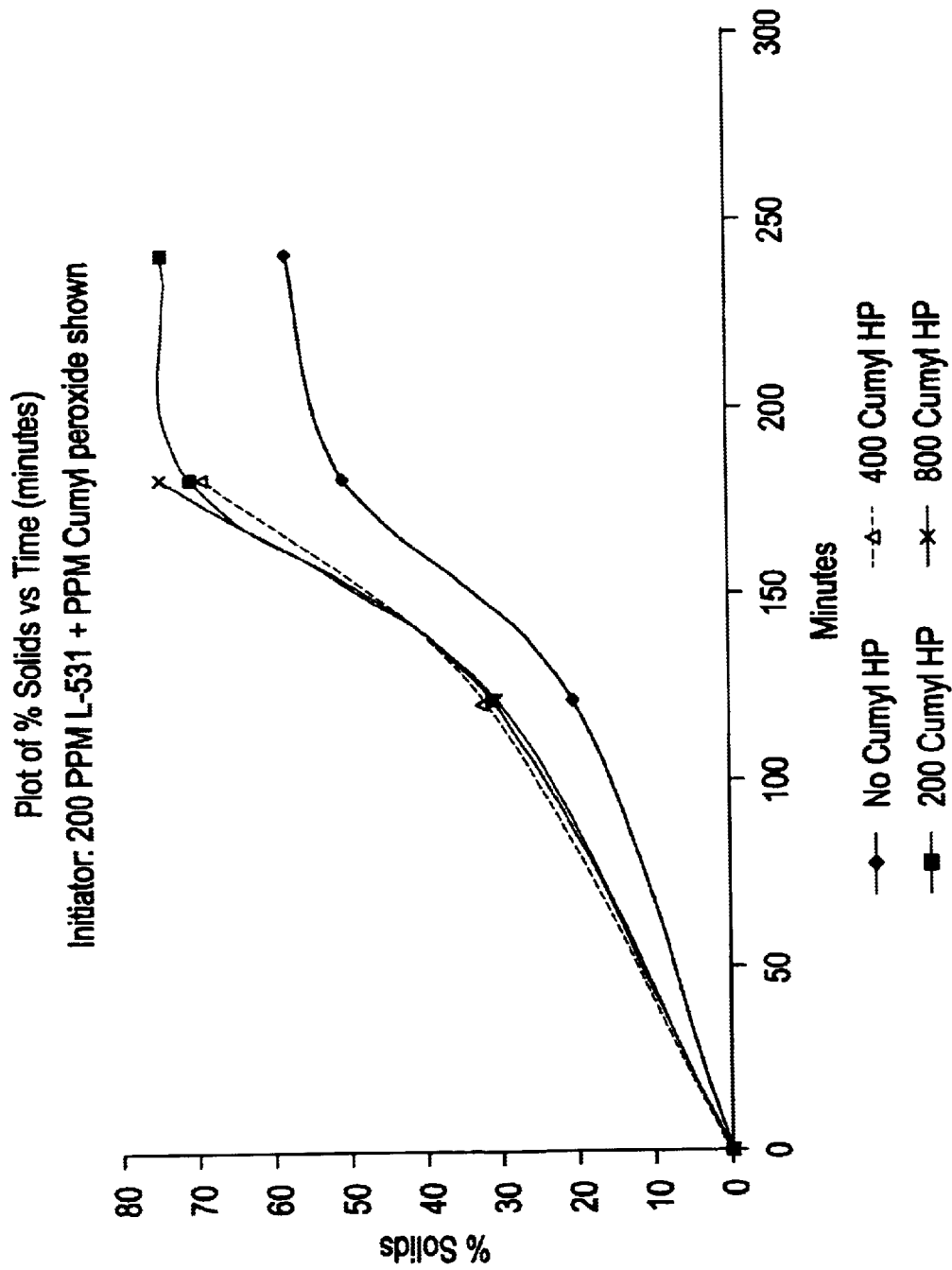
FIG. 6 is a graph of the effect of cumyl hydroperoxide on the rate of polymerization of styrene monomer (SM) as a plot of % solids vs. time; the initiator was 200 ppm L-531 and cumyl peroxide ppm as shown.

FIG. 6 shows that the addition of cumyl hydroperoxide increases the rate of reaction. Adding higher levels of cumyl hydroperoxide do not appear to increase the rate above that when 200 PPM are used in styrene polymerizations. This is again surprising since the effect is observed in HIPS with three different hydroperoxides of this invention.

Figure 7:
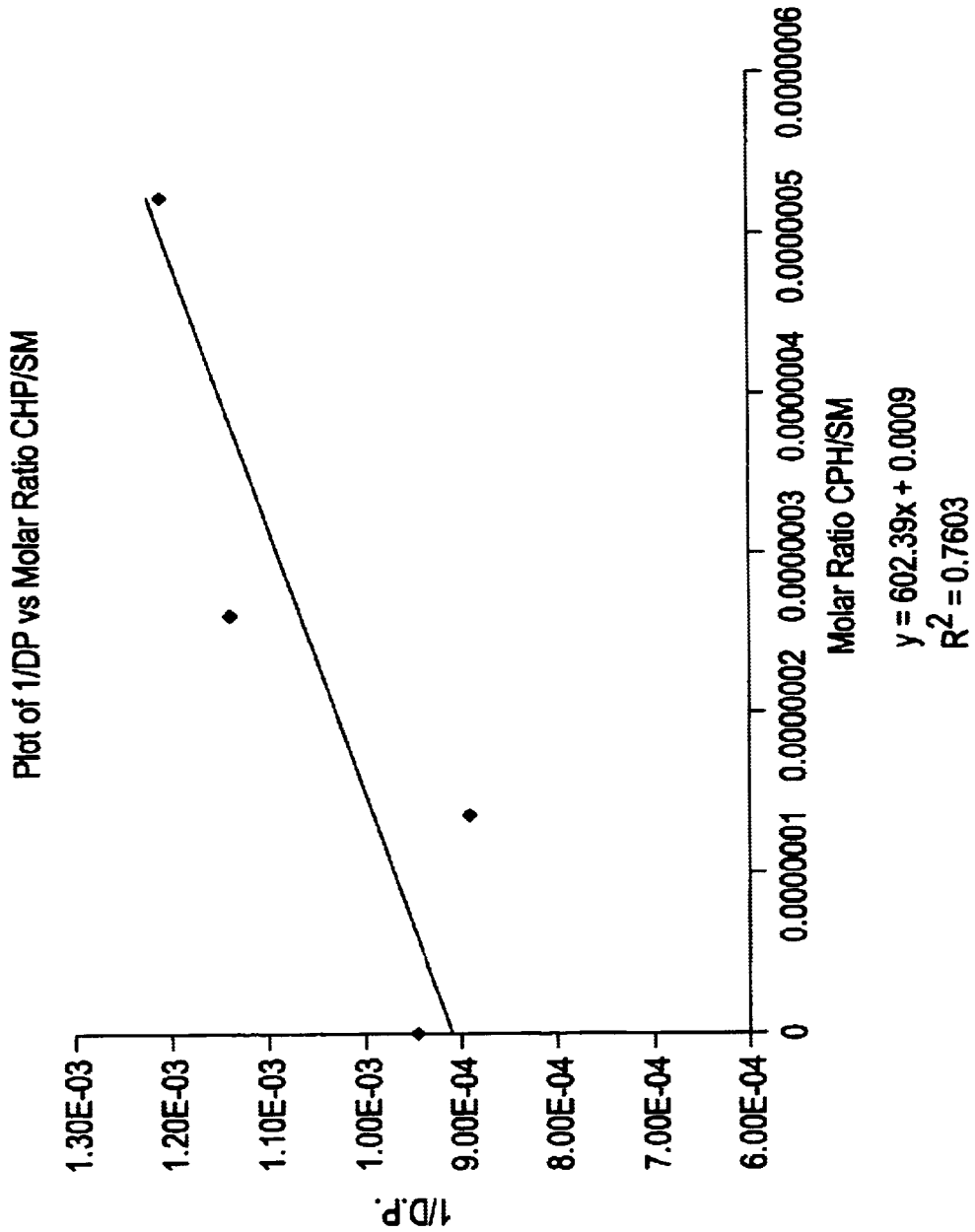
FIG. 7 is a graph of 1/degree of polymerization vs. CHP/styrene monomer molar ratio.

Table VI shows the molecular weight and MFI data for the materials that were obtained. A decrease in molecular weight is observed indicating the role of CHP as a chain transfer agent. A plot of 1/degree of polymerization vs. CHP/Styrene molar ratio gives a chain transfer constant for CHP of about 600, which is unusually high, considering the chain transfer constant of NDM is 10–13 at the conditions used (See FIG. 7).

TABLE VI

Molecular Weight and MFI Data for Styrene Polymerizations with 200 PPM of L-531 and Various Levels of Cumyl Hydroperoxide

| | Ex. | | | |
|---|---|---|---|---|
| TEST | 28 No Cumyl HP | 29 200 ppm Cumyl HP | 30 400 ppm Cumyl HP | 31 800 ppm Cumyl HP |
| MELT FLOW | 1.7744 | 2.133 | 2.91 | 4.636 |
| Mn | 109528 | 117434 | 90552 | 86348 |
| Mw | 286811 | 257926 | 205030 | 202864 |
| Mz | 454403 | 399928 | 327495 | 319601 |
| Peak MW | 291884 | 258548 | 203601 | 204717 |
| Polydispersity | 2.6 | 2.2 | 2.3 | 2.4 |

Attention will now be turned to the use of metallic salts as accelerators. T-butyl hydroperoxide in combination with metallic salts (e.g. cobalt naphthenate) has been used in the past to initiate polymerizations at or around room temperature. Metallic salts have been known to accelerate the decomposition of hydroperoxides; for example, cobalt naphthenate and the hydroperoxide of methyl ethyl ketone are used to cure unsaturated polyesters. Although t-butyl hydroperoxide has a one-hour half-life of 185° C., its decomposition to yield free radicals can be catalyzed (accelerated or promoted) at room temperature. The initiation of catalyst oxidation reaction is illustrated here with cobalt (Co) as a multivalent metal.

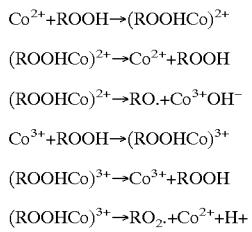

$Co^{2+} + ROOH \rightarrow (ROOHCo)^{2+}$ $(ROOHCo)^{2+} \rightarrow Co^{2+} + ROOH$ $(ROOHCo)^{2+} \rightarrow RO\cdot + Co^{3+}OH^-$ $Co^{3+} + ROOH \rightarrow (ROOHCo)^{3+}$ $(ROOHCo)^{3+} \rightarrow Co^{3+} + ROOH$ $(ROOHCo)^{3+} \rightarrow RO_2\cdot + Co^{2+} + H+$ It has been discovered that metallic accelerators can also be used to accelerate the decomposition of other peroxides that are commonly used in the manufacture of styrene and high impact polystyrene.

Figure 8:
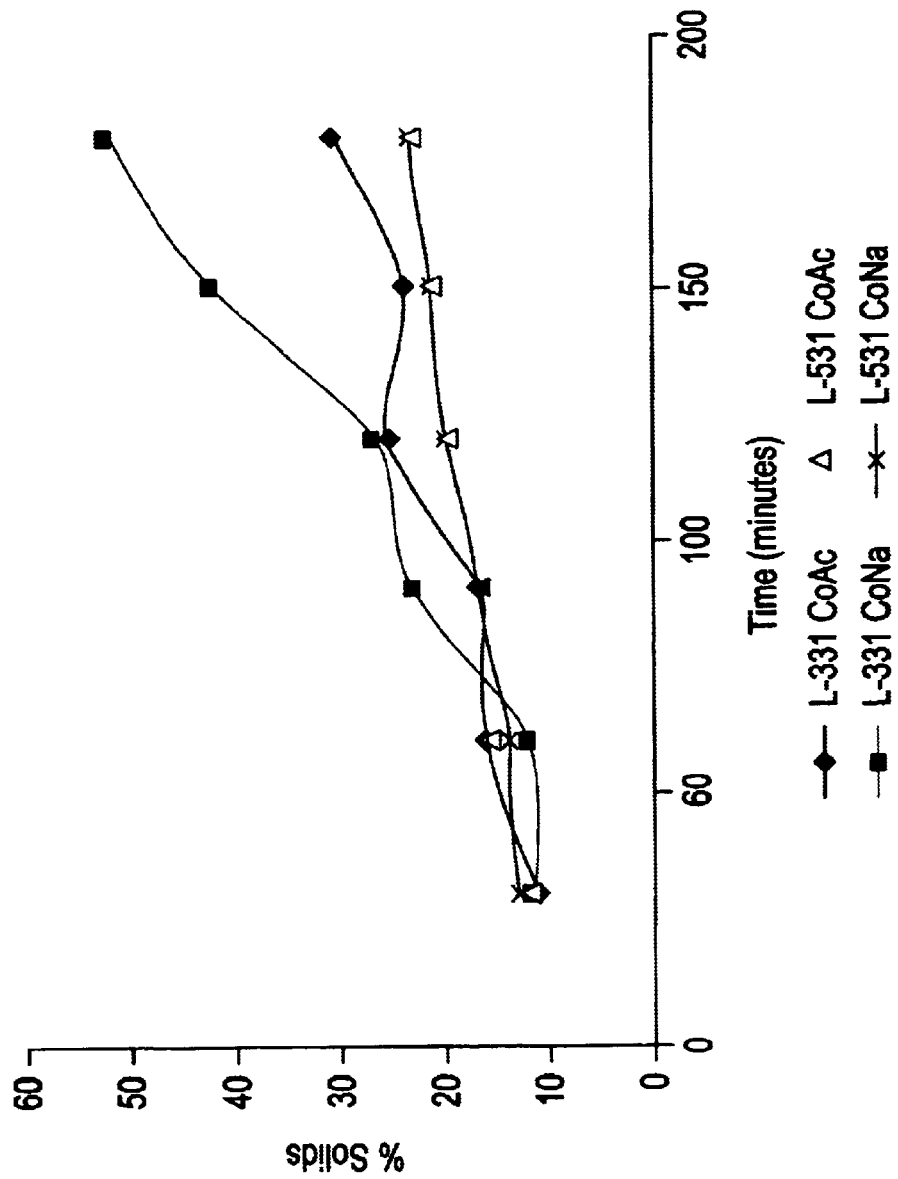
FIG. 8 is graph of the effect of 150 ppm of cobalt compounds on the % solids in formulations using 8% B-550 and 200 ppm initiator.

FIG. 8 shows the unexpected effect of cobalt naphthenate (CoNa), but not cobalt acetoacetonate (CoAc), in initiating styrene solutions when mixed with 1,1-di-(t-butylperoxy) cyclohexane (Lupersol-331) and 1,1-di-(t-amylperoxy) cyclohexane (Lupersol-531). CoAc has no effect, while CoNa accelerates the polymerization with Lupersol-331 but not with Lupersol-531.

Figure 9:
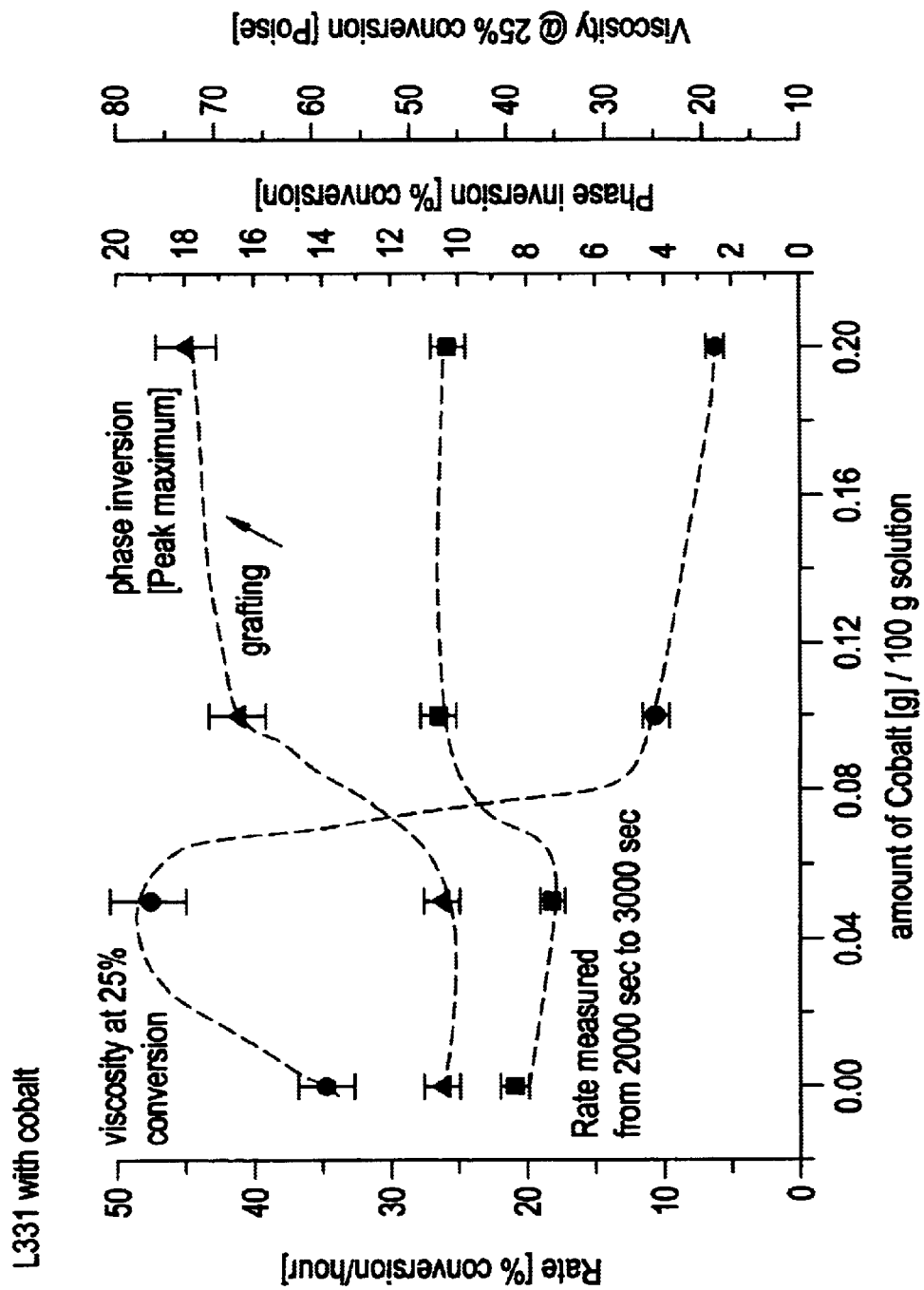
FIG. 9 is a graph showing how cobalt accelerators together with L-331 affect the rate of polymerization, the point of inversion, and the overall viscosity.

This effect has also been demonstrated in polymerizations carried out in a rheometer. Surprisingly, the polymerization with Lupersol-331 is better catalyzed with cobalt naphthenate than cobalt acetylacetonate whereas for Lupersol-531 the polymerization is better catalyzed with cobalt acetylacetonate than cobalt naphthenate. In the synthesis of HIPS, cobalt compounds affect rate of polymerization, the point of inversion and the overall viscosity as shown in FIG. 9.

A goal of the invention is to use this reaction to form peroxide groups on the rubber in the presence of styrene at low temperatures to improve the amount of grafting in a HIPS process.

Without wishing to be bound by any one theory, in a non-limiting embodiment of the invention, the mechanism that is proposed to activate the double bonds or vinyl groups in the rubber molecule may require the formation of a complex with cobalt and the hydrogen abstraction by the hydroperoxide group/naphthenate redox reaction. Since the addition reaction of the hydroperoxides to double bonds is slow, it may be possible to form peroxide groups on the rubber without significant PS formation.

Initial reactions were carried out using a standard formulation of 200 grams of 8% Bayer 550 at 70 to 90° C. using 0.1 gram of t-butyl hydroperoxide (TBH) and 0.02 grams of 75/25 cobalt naphthenate/cobalt acetylacetonate (CoNa/CoAc). The one-hour half-life temperature of t-butyl hydroperoxide is 185° C.

Figure 10:
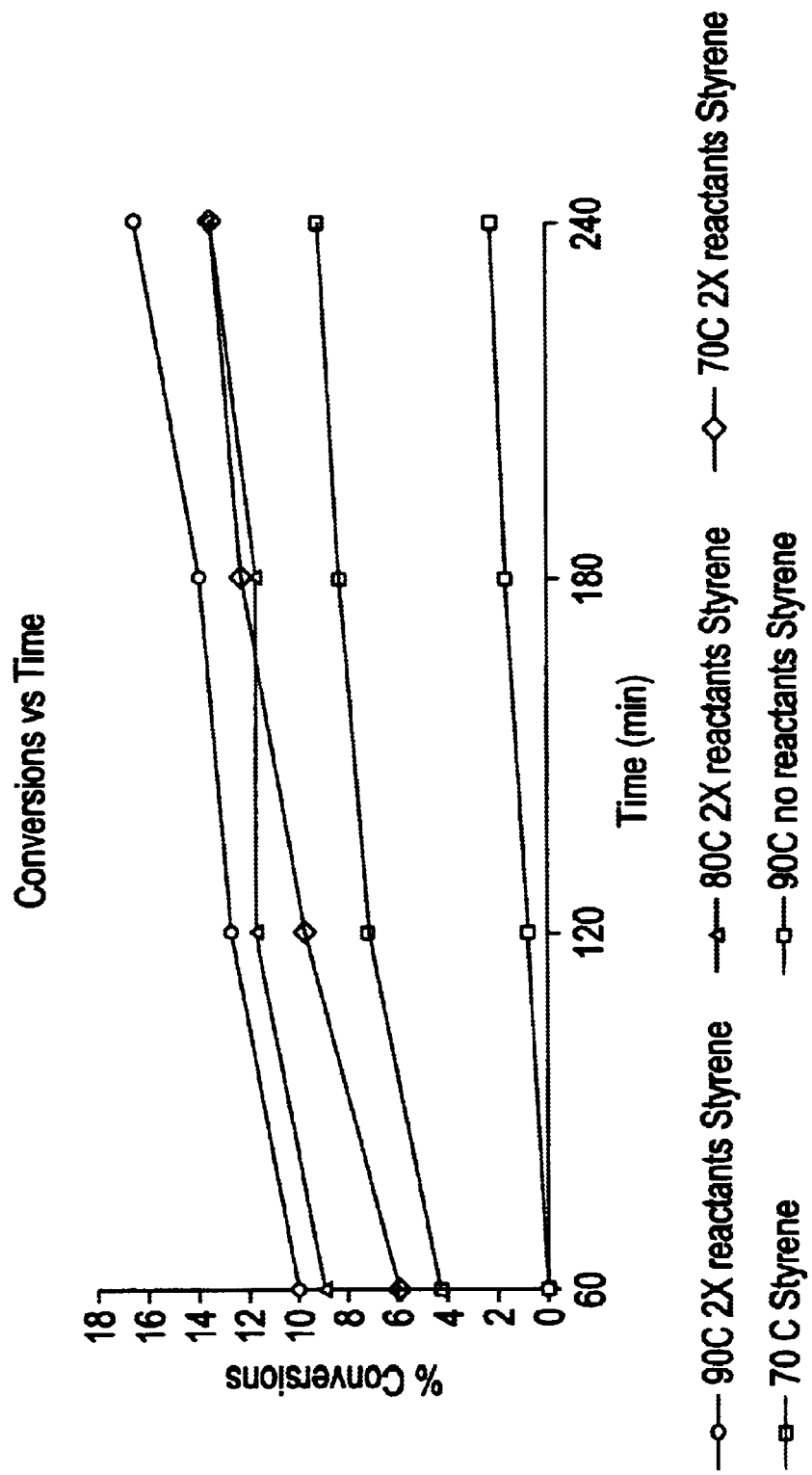
FIG. 10 is a graph showing the % polystyrene conversions as a function of time using various TBH/cobalt initiator mixtures.

FIG. 10 is a graph of polystyrene conversion as a function of time using the indicated TBH/cobalt initiator mixtures. The cobalt initiator used in this Figure was a cobalt solution of 75/25 cobalt naphthenate/cobalt acetoacetonate in an aliphatic hydrocarbon solvent. In a typical batch polymerization consisting of 200 grams of an 8% Bayer 550 solution, 0.02 grams of the cobalt solution or 100 ppm of the solution was used.

As noted, cobalt naphthenate and hydroperoxides of methyl ethyl ketone or other hydroperoxides are known to initiate styrene polymerizations at room temperature, and in fact, this reaction is used to form castings. FIG. 10 shows the % solids formed when styrene is heated in the presence of various levels of the initiator mixture (0, 1× and 2× the amount mentioned above).

Figure 11:
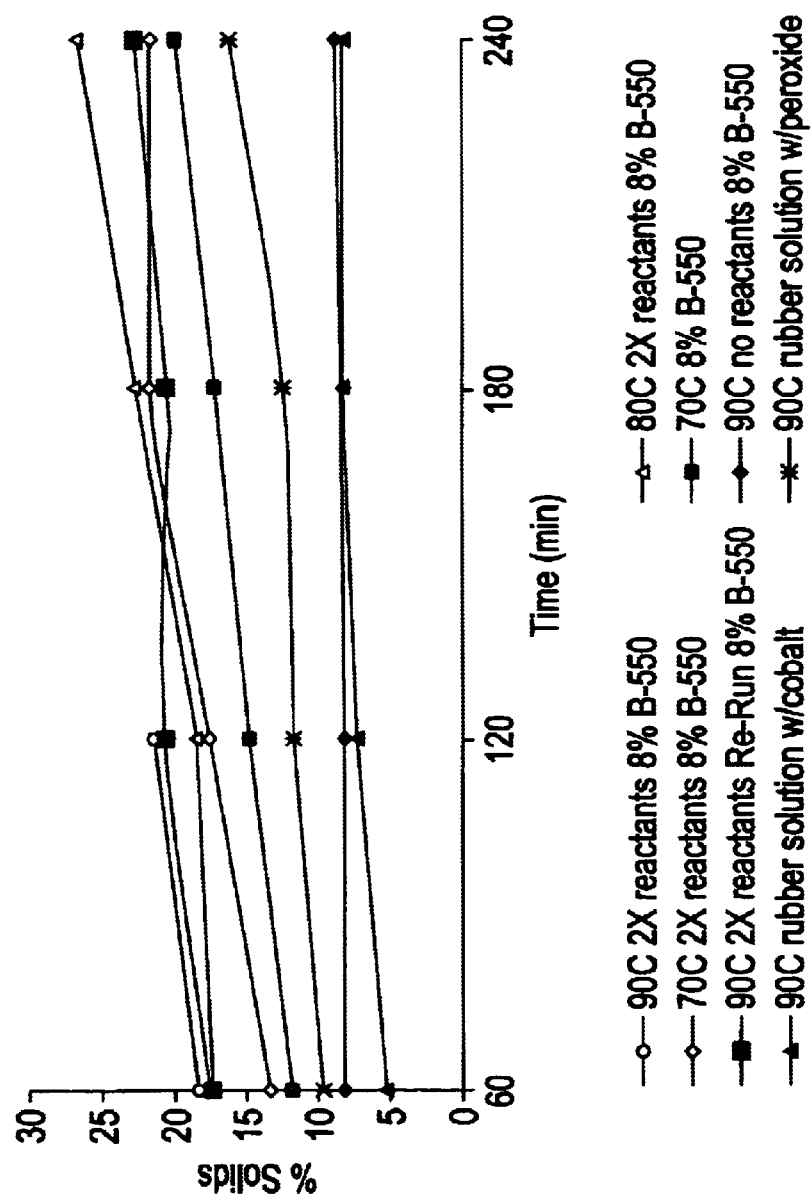
FIG. 11 is a graph of % solids as a function of time using various TBH/cobalt initiator mixtures.

It has been observed that at 70–90° C., the initiator mixture is initiating the styrene polymerization. The hydroperoxide is more active than expected. Also, FIG. 11 shows styrene polymerizations carried out in the presence of 8% Bayer 550. Although the polymerizations were stopped at low % solids, the viscosity of the solutions was very high. Normally, batch polymerizations are carried out to 40–50% solids; however, with this initiator mixture the solutions appeared to form loose gels.

Although TBH has a 1-hour half-life equal to 185° C., it can be easily activated at 90° C. in the presence of cobalt. At the concentration used, the reaction is fast at the beginning of the reaction, with 6% of PS formed after 30 minutes versus 4% for 150 ppm TBIC, then it slows down after 1 hour. Over time, the formulation TBH/cobalt is roughly equivalent to 150 ppm of TBIC but much slower than TAEC or L231 formulations.

Figure 12:
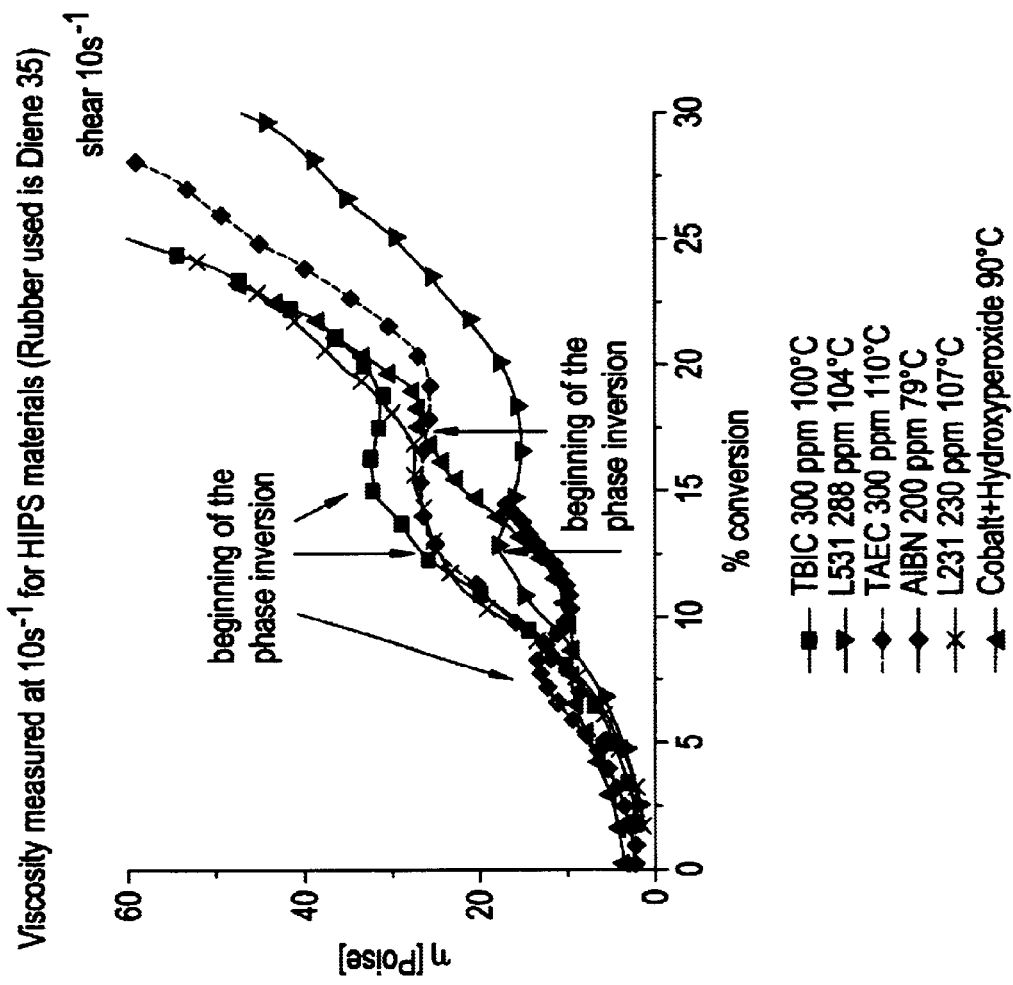
FIG. 12 is a graph of the viscosity measured at 10 s$^{-1}$ for HIPS as a function of % conversion.

FIG. 12 displays the viscosity response for HIPS as a function of the percent of polystyrene formed (conversion). The viscosity increases in a two-step process (plateau) with a first plateau at 7.5% solids that seems to match the conversion. Then a second plateau exists around 17.5% percent of conversion and equal to the viscosity at the phase inversion for TAEC and L231 formulations. At the end of the run gels were found in the bottom of the Couette cell (a very low shear region).

In summary, t-butyl hydroperoxide in the presence of cobalt naphthenate allows polymerization at much lower temperature.

Liquid adsorption chromatography (LAC) has been used to determine the amount of grafted polybutadiene-polystyrene copolymer (g PB-PS). In this application, LAC was used as a chromatographic technique to separate polystyrene homopolymer (PS) from the g PB-PS copolymer. The chromatograph uses a UV detector so that molecules containing PS and g PB-PS can be detected. Polybutadiene homopolymer (PB) is not detected. LAC is used to determine the ratio of g PB-PS to PS formed up to the inversion point. If the PB portion of the molecule is crosslinked, LAC cannot be used.

Figure 13:
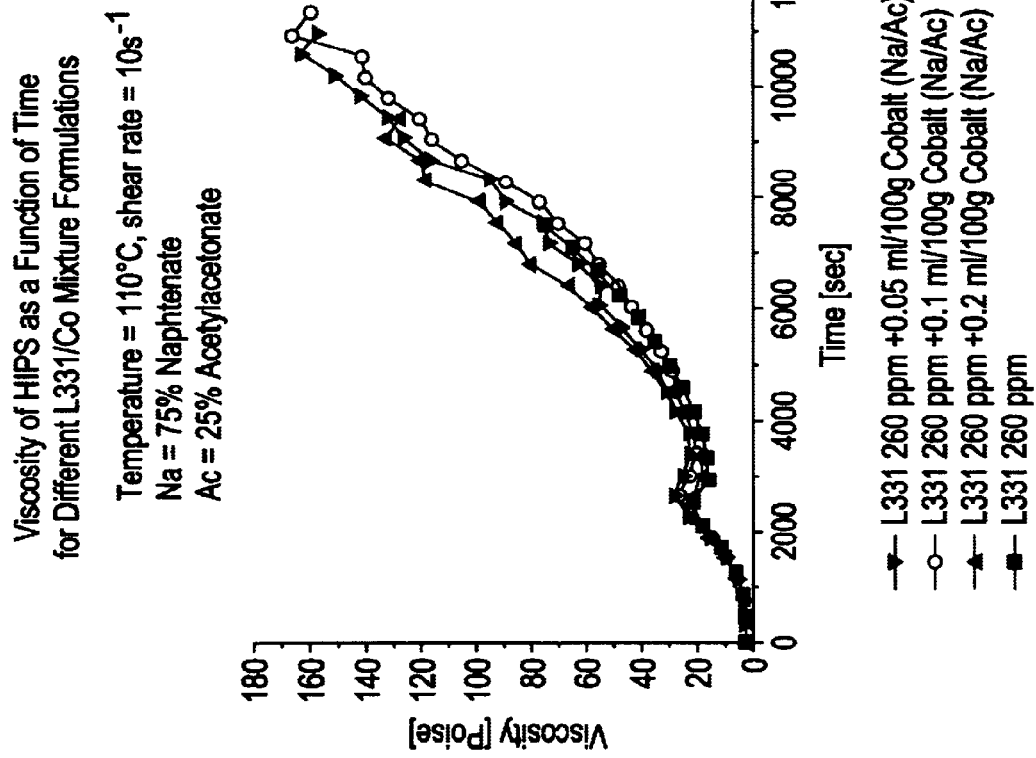
FIG. 13 is a graph of the viscosity of HIPS as a function of time for different L331/Co mixture formulations.

FIG. 13 displays the viscosity of HIPS as a function of time for different L331/Co mixture formulations. The phase inversion is easily identified by the viscosity peak that is slightly shifted in presence of cobalt.

Figure 14:
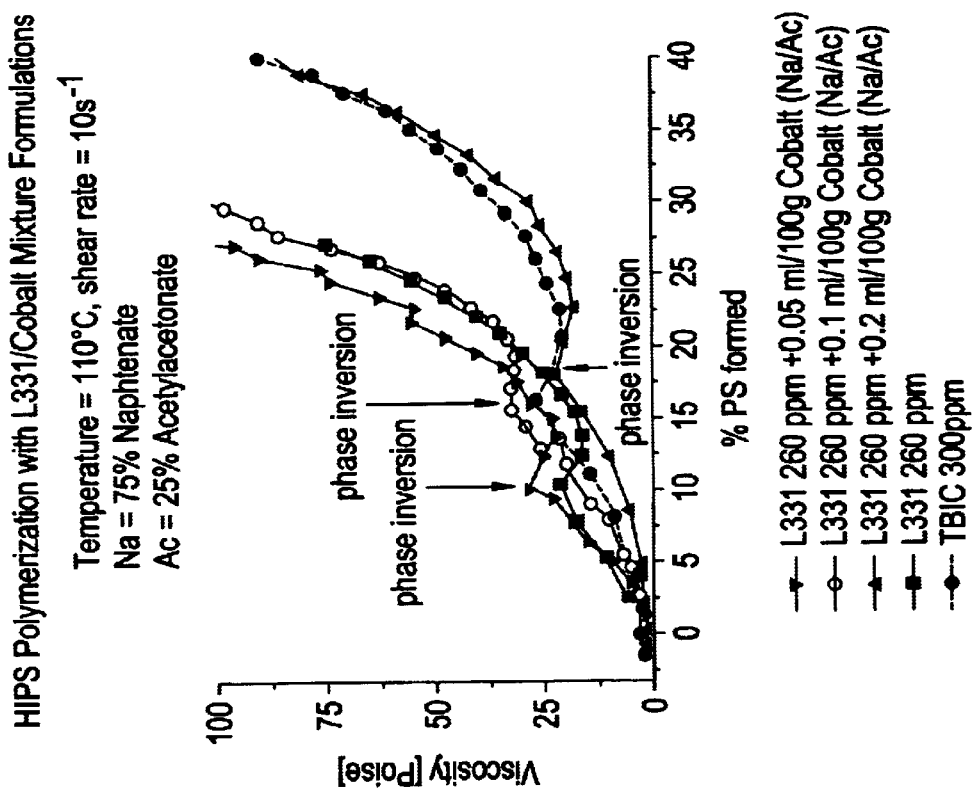
FIG. 14 is a graph of the viscosity of HIPS with L331/Co mixture formulations.

To compare the different formulations used the viscosity is plotted as a function of PS crystal formed (FIG. 14). The point of phase inversion is shifted to a higher rate with increasing the amount of cobalt that is attributed to an increase of grafting. For comparison, TBIC is as well presented here and its maximum peak viscosity is located at the same percent conversion as L331/Co. However the viscosity of L331/Co is lower and in some aspect, this result is very similar to L531 alone where a competition between rate and grafting was suggested.

Figure 15:
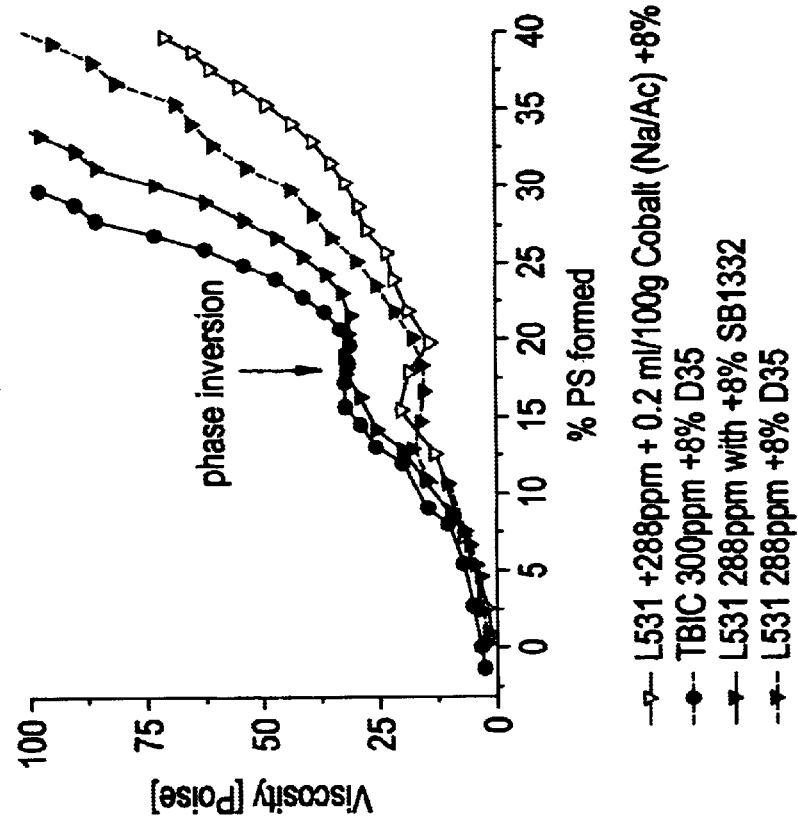
FIG. 15 is another graph of the viscosity of HIPS with L331/Co mixture formulations.

FIG. 15 displays the HIPS polymerization with L531/cobalt mixture formulations. In presence of cobalt, the peak viscosity is slightly shifted to higher conversion and the improvement appeared to be lower than with L331. For comparison, TBIC and L531 with SB1332 are as well presented here and in both cases, the viscosity plateau shows higher value. By replacing the homopolymer Diene 35 with a block copolymer SB1332, which acts as a surfactant, the viscosity plateau is shifted even more to higher conversion. SB1332 is a styrene/butadiene co-monomer resin available from Dynasol, Houston, Tex.

Figure 16:
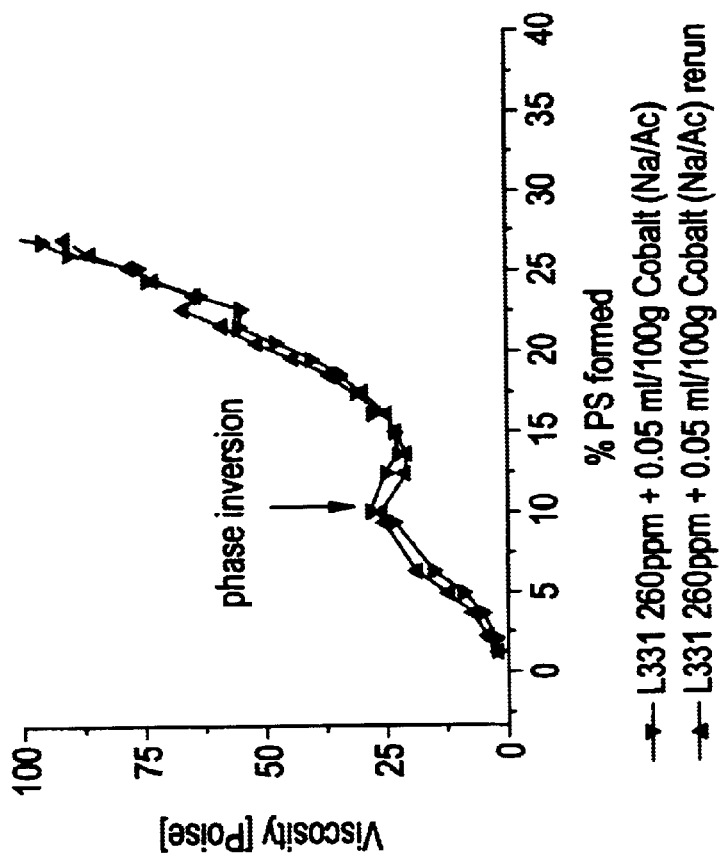
FIG. 16 is a graph of two runs of viscosity as a function of % PS formed with L-331 and 0.05 ml of cobalt mixtures.

As seen before, L331 benefits the most in terms of rate and probably in terms of grafting from the presence of cobalt. Although the position and amplitude of the viscosity peak is unchanged with 0.05 ml of cobalt, the viscosity after the phase inversion is strongly affected (FIG. 9). To confirm that the data point 0.05 ml/Co was run twice (FIG. 16).

Figure 17:
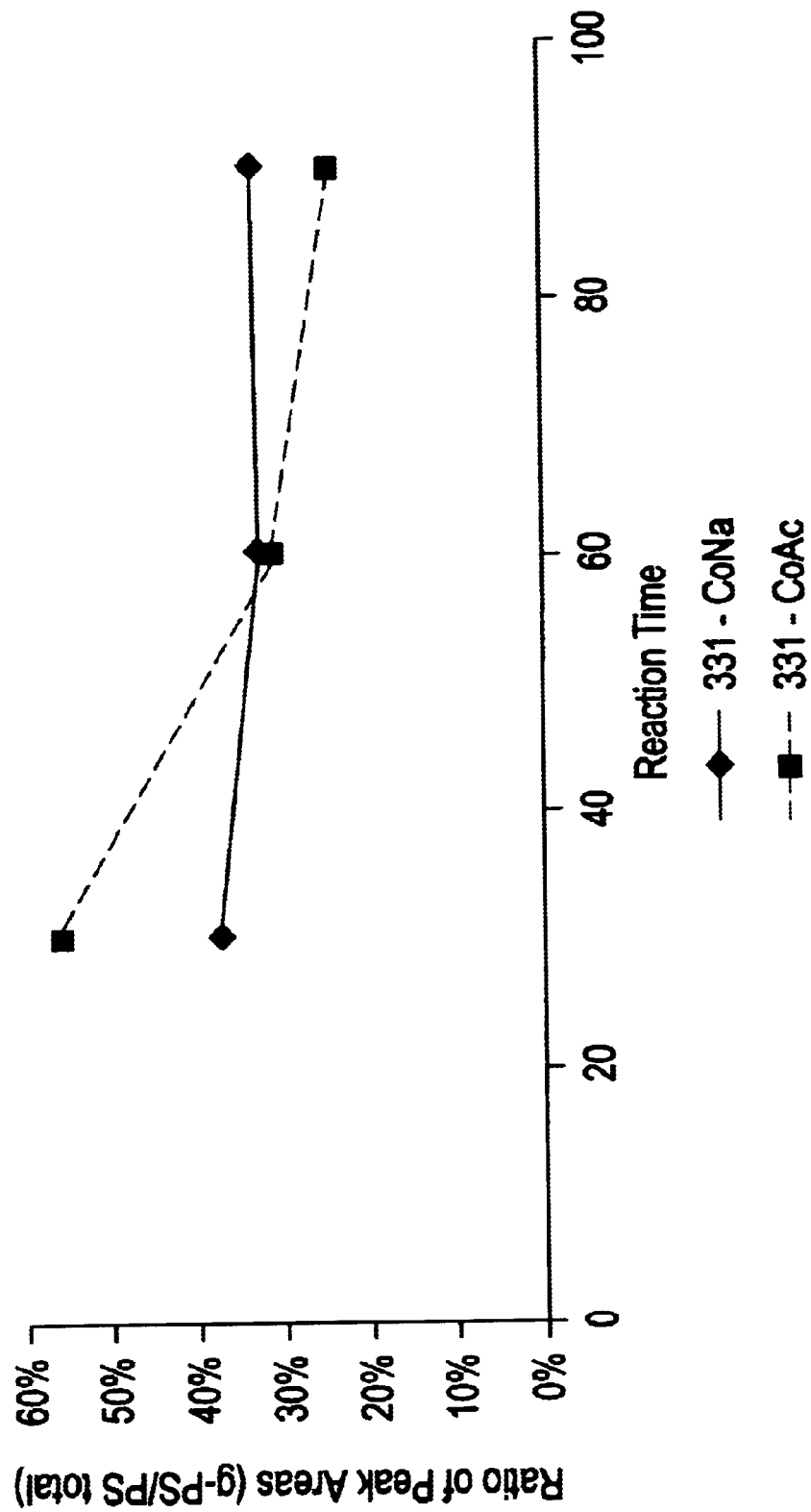
FIG. 17 is a graph of the ratio of peak areas of grafted polystyrene (g-PS) to total polystyrene as a function of reaction time for CoNa and CoAc with L-331.
Figure 18:
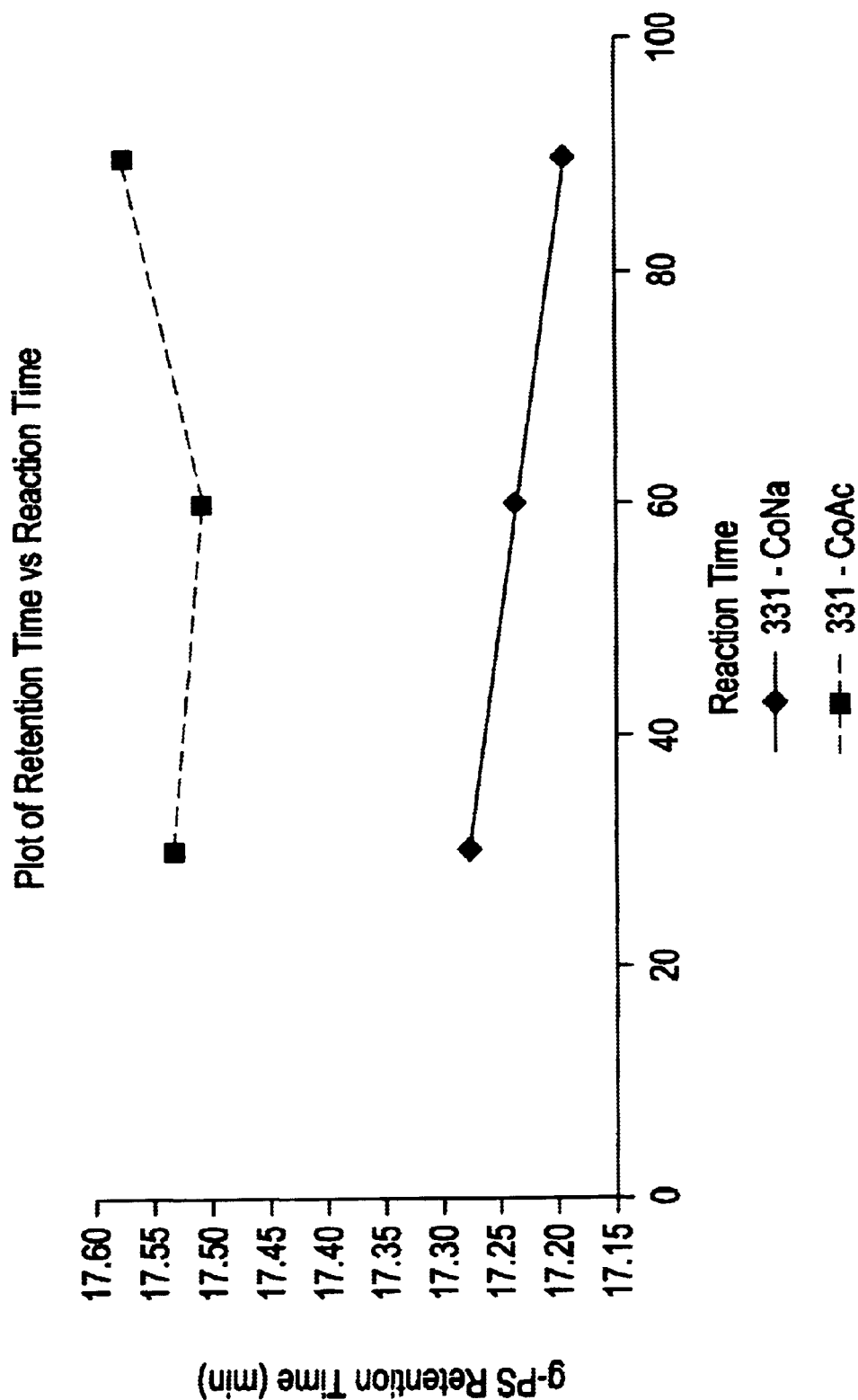
FIG. 18 is a graph of the retention time of grafted polystyrene as a function of reaction time.

FIGS. 8, 17 and 18 present previous and new data that has been obtained with L-331 and CoNa and CoAc. As previously discussed, FIG. 8 shows that CoNa has an accelerating affect on rate. FIG. 17 shows that both cobalt compounds (CoNa and CoAc) have similar grafting efficiencies. The degree of grafting at the conditions selected is slightly higher than when L-331 is used alone. FIG. 18 shows the differences in the retention time for the graft copolymers.

In summary, a strong rate increase was found when L331 and cobalt naphthenate are combined, whereas little improvement was found with L531 and cobalt acetylacetonate. The use of TBH in the synthesis of HIPS at temperatures around 100° C. normally shows a very small catalytic effect ($T_{1/2}$ 1 hour=185° C.). In presence of cobalt compounds, TBH strongly decomposes at 90° C. and is able to form polystyrene and polybutadiene-graft-polystyrene. A closer look at the viscosity of PS crystal solution at constant conversion shows a viscosity decrease (up to 60%) with increasing the amount of cobalt salts due to the presence of lower molecular weight polystyrene chains. A difference was found as well between cobalt naphthenate and cobalt acetylacetonate when combined with L331 or L531. The viscosity values were found relatively high with an opposite trend.

These results confirmed the important role of cobalt compounds as a radical promoter as well as a grafting promoter. Work was conducted by mixing TBH with L531 and TAEC. It was found that TBH is itself acting as a radical promoter under the conditions used and TAEC seems to be affected more than L-531. An increase of gel to rubber ratio (G/R) was observed by the use of TBH.

In the foregoing specification, the invention has been described with reference to specific embodiments thereof, and has been demonstrated as effective in providing methods for preparing polymers using accelerators together with peroxide initiators. However, it will be evident that various modifications and changes can be made thereto without departing from the scope of the invention as set forth in the appended claims. Accordingly, the specification is to be regarded in an illustrative rather than a restrictive sense. For example, specific combinations or amounts of vinylaromatic monomers, diene co-monomers, peroxide initiators, accelerators, and other components falling within the claimed parameters, but not specifically identified or tried in a particular polymer system, are anticipated and expected to be within the scope of this invention. Further, the methods of the invention are expected to work at other conditions, particularly temperature, pressure and proportion conditions, than those exemplified herein.

We claim:

1. A method for producing a polymerized product comprising:
   (a) polymerizing at least one vinylaromatic monomer in the presence of a peroxide initiator;
   (b) adding an accelerator to the vinylaromatic monomer, where the accelerator is selected from the group consisting of a metallic salt, and mixtures of a metallic salt and a hydroperoxide, and where the amount of accelerator is effective to accelerate the rate of polymerization as compared with an otherwise identical method absent the accelerator; and
   (c) recovering a polymerized product.

2. The method of claim 1 where in polymerizing the monomer, the vinylaromatic monomer is styrene.

3. The method of claim 1 where in polymerizing the monomer, the peroxide initiator is selected from the group consisting of 1,1-di-(t-butylperoxy)cyclohexane; 1,1-di-(t-amylperoxy)cyclohexane; t-amyl peroxy-2-ethylhexyl carbonate (TAEC), t-butylperoxy isopropyl carbonate (TBIC), ethyl-3,3-di-(t-butylperoxy)butyrate; t-butyl perbenzoate; 1,1-di-(t-butylperoxy)-3,3,5-trimethyl-cyclohexane, and mixtures thereof.

4. The method of claim 1 where in adding the accelerator, the hydroperoxide accelerator is selected from the group consisting of t-butyl hydroperoxide (TBH), cumyl hydroperoxide, p-isopropyl cumyl hydroperoxide, methyl ethyl ketone hydroperoxide, 1,1,3,3,-tetramethyl butyl hydroperoxide and cyclohexane hydroperoxide; and the metallic salt accelerator is selected from the group consisting of cobalt naphthenate, cobalt acetoacetonate, cobalt octoate (2-ethyl hexanoate), copper naphthenate, iron octoate (2-ethyl hexanoate), and iron naphthenate; and mixtures thereof.

5. The method of claim 1 where in adding the accelerator, the accelerator is a metallic salt accelerator added in an amount ranging from about 10 to about 600 ppm, based on the vinylaromatic monomer.

6. The method of claim 1 where in polymerizing the monomer, the polymerizing is conducted at a temperature between about 110° C. and about 170° C.

7. The method of claim 1 where in polymerizing the monomer, the amount of accelerator is effective to increase the rate of decomposition of the peroxide initiator as compared with an otherwise identical method absent the accelerator.

8. The method of claim 1 where in polymerizing the monomer, the polymerizing is conducted in the presence of at least one diene polymer and the amount of accelerator is effective to increase the grafting of the resultant co-polymer as compared with an otherwise identical method absent the accelerator.

9. The method of claim 8 where the weight ratio of vinylaromatic monomer to diene polymer ranges from about 97:3 to about 85:15.

10. The method of claim 1 where in recovering the product, the polymerized product is high impact polystyrene (HIPS).

11. A vinylaromatic monomer resin comprising at least one vinylaromatic monomer, at least one peroxide initiator, and at least one accelerator selected from the group consisting of a metallic salt, and mixtures of a metallic salt and a hydroperoxide, where the amount of accelerator is effective to accelerate the rate of polymerization, to increase the grafting of the resultant polymer or both, as compared with an otherwise identical method absent the accelerator.

12. The vinylaromatic monomer resin of claim 11 where the vinylaromatic monomer is styrene.

13. The vinylaromatic monomer resin of claim 11 where the peroxide initiator is selected from the group consisting of 1,1-di-(t-butylperoxy)cyclohexane; 1,1-di-(t-amylperoxy)cyclohexane; t-amyl peroxy-2-ethylhexyl carbonate (TAEC), t-butylperoxy isopropyl carbonate (TBIC), ethyl-3,3-di(t-butylperoxy)butyrate; t-butyl perbenzoate; 1,1-di-(t-butylperoxy)-3,3,5-trimethyl-cyclohexane; and mixtures thereof.

14. The vinylaromatic monomer resin of claim 11 where the hydroperoxide accelerator is selected from the group consisting of t-butyl hydroperoxide (TBH), cumyl hydroperoxide, p-isopropyl cumyl hydroperoxide, methyl ethyl ketone hydroperoxide, 1,1,3,3-tetramethyl butyl hydroperoxide and cyclohexane hydroperoxide; and the metallic salt accelerator is selected from the group consisting of cobalt naphthenate, cobalt acetoacetonate, cobalt octoate (2-ethyl hexanoate), copper naphthenate, iron octoate (2-ethyl hexanoate), and iron naphthenate; and mixtures thereof.

15. The vinylaromatic monomer resin of claim 11 where the accelerator is a metallic salt accelerator added in an amount ranging from about 10 to about 600 ppm based on the vinylaromatic monomer.

16. The vinylaromatic monomer resin of claim 11 where the amount of accelerator is effective to increase the rate of decomposition of the peroxide initiator as compared with an otherwise identical method absent the accelerator.

17. The vinylaromatic monomer resin of claim 11 further comprising at least one diene polymer, where the amount of accelerator is effective to increase the grafting of the resultant co-polymer as compared with an otherwise identical method absent the accelerator.

18. The vinylaromatic monomer resin of claim 17 where the weight ratio of vinylaromatic monomer to diene polymer ranges from about 91:9 to about 85:15.

19. A vinylaromatic/diene graft copolymer made by the method comprising:
(a) reacting at least one vinylaromatic monomer with at least one polydiene, in the presence of a peroxide initiator;
(b) adding an accelerator to the vinylaromatic monomer, where the accelerator is selected from the group consisting of a metallic salt, and mixtures of a metallic salt and a hydroperoxide, and where the amount of accelerator is effective to increase the grafting of the copolymer as compared with an otherwise identical method absent the accelerator; and
(c) recovering a polymerized product.

20. The copolymer of claim 19 where in reacting the vinylaromatic monomer with the polydiene, the vinylaromatic monomer is styrene and the polydiene is butadiene.

21. The copolymer of claim 19 where in reacting the vinylaromatic monomer with the polydiene, the peroxide initiator is selected from the group consisting of 1,1-di-(t-butylperoxy)cyclohexane; 1,1-di(t-amylperoxy)cyclohexane; t-amyl peroxy-2-ethylhexyl carbonate (TAEC), t-butylperoxy isopropyl carbonate (TBIC), ethyl-3,3-di(t-butylperoxy)butyrate; t-butyl perbenzoate; 1,1-di-(t-butylperoxy)-3,3,5-trimethyl-cyclohexane; and mixtures thereof.

22. The copolymer of claim 19 where in adding the accelerator, the hydroperoxide accelerator is selected from the group consisting of t-butyl hydroperoxide (TBH), cumyl hydroperoxide, p-isopropyl cumyl hydroperoxide, methyl ethyl ketone hydroperoxide, 1,1,3,3-tetramethyl butyl hydroperoxide and cyclohexane hydroperoxide; and the metallic salt accelerator is selected from the group consisting of cobalt naphthenate, cobalt acetoacetonate, cobalt octoate (2-ethyl hexanoate), copper naphthenate, iron octoate (2-ethyl hexanoate), and iron naphthenate; and mixtures thereof.

23. The copolymer of claim 19 where in adding the accelerator, the accelerator is a metallic salt accelerator added in an amount ranging from about 10 to about 600 ppm, based on the vinylaromatic monomer.

24. The copolymer of claim 19 where in reacting the vinylaromatic monomer with the polydiene, the polymerizing is conducted at a temperature between about 110° C. and about 150° C.

25. The copolymer of claim 19 where in reacting the vinylaromatic monomer with the polydiene, the amount of accelerator is effective to increase the rate of decomposition of the peroxide initiator as compared with an otherwise identical method absent the accelerator.

26. The copolymer of claim 25 where the weight ratio of vinylaromatic monomer to polydiene ranges from about 97:3 to about 85:15.

27. The copolymer of claim 19 where in recovering the product, the polymerizing product is high impact polystyrene (HIPS).

* * * * *